United States Patent [19]
Tokarz

[11] 3,725,763
[45] Apr. 3, 1973

[54] BACK GUAGE POSITION CONTROL FOR A PAPER CUTTING MACHINE

[75] Inventor: Henry J. Tokarz, East Lake, Ohio

[73] Assignee: Harris-Intertype Corporation, Cleveland, Ohio

[22] Filed: Nov. 27, 1970

[21] Appl. No.: 93,127

[52] U.S. Cl. .............. 318/600, 318/257, 318/467, 214/1.6
[51] Int. Cl. ............................................. G05b 19/26
[58] Field of Search .......... 318/467, 600, 6, 142, 257, 318/158, 85, 630; 214/1.6

[56] References Cited

UNITED STATES PATENTS

| | | | |
|---|---|---|---|
| 3,193,745 | 7/1965 | Brown | 318/630 |
| 3,260,378 | 7/1966 | Jackson | 318/85 X |
| 3,192,808 | 7/1965 | Fielder et al. | 318/600 X |
| 3,195,385 | 7/1965 | Paterson | 318/600 X |
| 3,181,403 | 5/1965 | Sterns et al. | 318/600 X |
| 3,445,640 | 5/1969 | Harrison et al. | 318/600 X |
| 2,933,626 | 4/1960 | Giboney et al. | 318/6 X |
| 3,048,751 | 8/1962 | Taylor | 318/257 X |
| 2,655,994 | 10/1953 | Vandenberg | 318/158 X |
| 2,692,361 | 10/1954 | Asbury et al. | 318/142 |

Primary Examiner—T. E. Lynch
Attorney—Yount & Tarolli

[57] ABSTRACT

A paper cutting machine control is provided for controlling the positioning of a movable back gauge relative to a guillotine type cutting tool. The back gauge is driven by a motor so as to normally advance toward the tool at a high speed and is controlled to a low speed or a stopped condition in dependence upon position command marks recorded on a control record. Relative motion proportional to the back gauge velocity is imparted between the control record and mark sensors, which includes both low speed and stop sensors for sequentially sensing each mark and respectively providing a low speed control signal and a stop control signal. These signals are respectively used for controlling the motor so that the back gauge is driven at its low speed or is at its stopped condition. The low speed sensor includes two sensing means spaced apart by a sufficient distance so that at least one low speed control signal is provided as the relative motion is being decreased to zero.

8 Claims, 8 Drawing Figures

INVENTOR
HENRY J. TOKARZ

BY Yount and Tarolli
ATTORNEYS

INVENTOR
HENRY J. TOKARZ

BY Youn and Tarolli
ATTORNEYS

BACK GUAGE POSITION CONTROL FOR A PAPER CUTTING MACHINE

This invention relates to the art of paper cutters and, more particularly, to an improved paper cutter control system for positioning a back gauge relative to a cutting tool in dependence upon control marks on a record member.

Paper cutting machines typically comprise a worktable upon which a back gauge is slideably movable for purposes of positioning a pile of material, such as paper, to be cut by a guillotine type cutting tool. The positioning of the back gauge, and, hence, the pile of material to be cut, is controlled pursuant to a cutting program typically recorded as magnetic or optical command marks on a record member. The command marks are sequentially read first by a deceleration sensor head for decelerating the back gauge from a high speed to a low speed, and then by a stop sensor head for stopping further movement of the back gauge so that a cutting operation may be performed. Thereafter, the back gauge may be further advanced toward the cutting tool at the high speed so as to minimize the time required to advance material to the cutting tool. Depending on the type of system employed, the sensors may be held stationary and the control record is moved passed the sensors at a speed proportional to that of the back gauge, or the control record may be held stationary and the sensors are moved at a speed proportional to that of the back gauge.

If the control system employs marks magnetically recorded on a magnetic tape together with magnetic sensor heads then relative motion is required between the marks and the sensor heads in order to produce a control signal. As the relative motion is decreased, such as when the back gauge is being decelerated to a stopped condition, it is possible that a mark is traveling passed the deceleration sensor at such a small velocity that any output signal pulse produced will not be sufficient to indicate to accompanying circuitry that a mark has been detected.

A particular problem incurred with paper cutting machine control systems takes place when two marks are spaced from each other by a distance slightly greater than the distance between the deceleration and stop sensor heads. Thus, when the first mark is sensed by the deceleration head the back gauge is controlled to move at the low speed. Once the first mark is sensed by the stop sensor head the back gauge is decelerated to a stopped condition. However, if the second mark is located behind the first mark by a distance slightly greater than the distance between the two sensor heads, then the second mark may have decelerated to a velocity less than a predetermined velocity needed to produce an effective output signal as it passes beneath the deceleration sensor head. Therefore, the second mark has been effectively missed. Depending on the control system employed, the back gauge, once the cutting operation has been completed, will immediately accelerate to the high speed rather than to the low speed dictated by the missed second mark. This would be an erroneous operation.

The present invention is directed toward preventing a second mark from being missed where two marks are spaced sufficiently close that the distance therebetween is slightly greater than the distance between the deceleration and stop sensing heads.

In accordance with the present invention, the deceleration or low speed sensor head includes two mark sensing means spaced apart by a distance dependent upon the relative displacement distance required for the relative motion between the sensors and the control record to be changed between the predetermined velocity needed to produce an effective output signal, to zero. Thus, for example, as the back gauge is decelerated from its low speed at least one of the sensing means will sense a mark when the relative motion is greater than the predetermined velocity so that at least one low speed control is developed.

In accordance with a more limited aspect of the invention, the first and second low speed mark sensing means are spaced apart by a distance which is slightly greater than twice that of the relative displacement distance required for the relative motion to change from the predetermined velocity to zero.

In accordance with a still further aspect of the present invention, the record member is a magnetic control tape and the control marks are magnetically recorded thereon.

In accordance with a still further aspect of the present invention, the first and second low speed mark sensing means includes dual gap magnetic core means having two spaced apart sensing gaps.

The primary object of the present invention is to provide improved control in positioning a back gauge relative to a cutting tool in dependence upon control marks on a control record.

A still further object of the present invention is to prevent a second mark from being missed when a pair of marks are spaced apart by a distance slightly greater than the distance between deceleration and stop sensor heads in a paper cutting machine control system.

A still further object of the present invention is to provide an improved deceleration sensor head for a paper cutting machine control wherein the sensor head includes two sensors spaced apart by a sufficient distance to prevent a command mark from being missed.

The foregoing and other objects and advantages of the invention will become more readily apparent from the following description of the preferred embodiment of the invention taken in conjunction with the accompanying drawings which are a part hereof and wherein:

FIG. 7 is a schematic illustration of a dual gap deceleration sensor head used in the present invention; and, FIG. 8 is a graphical illustration of the speed profile of the back gauge when it is decelerated from its low speed to a stopped condition when the dual gap deceleration sensor head of the present invention is employed.

Figure 1:
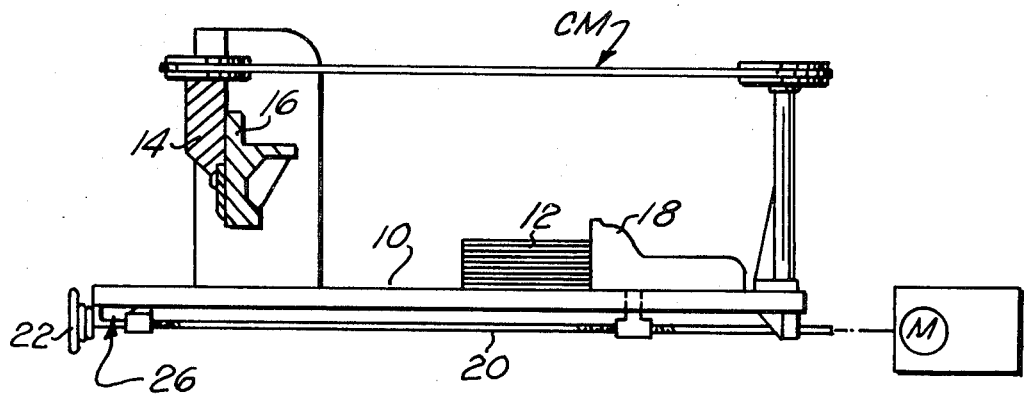
FIG. 1 is a side view of a paper cutter machine to which the present invention may be applied.

Referring now to the drawings, and more particularly to FIG. 1, there is illustrated a paper cutting machine CM including a table 10 upon which a stack of material 12, such as paper, is placed to be cut by a knife 14. During the cutting operation, material 12 is held in place by a clamp 16. A back gauge 18 is slideably movable along table 10 and serves to position the material 12 beneath the knife. Back gauge 18 is slideably moved along the surface of the table 10 by means of a lead screw 20 rotatably supported beneath the table. Lead screw 20 may be turned to adjust the position of back gauge 18 by means of a hand wheel 22. During normal operation, however, it is contemplated that lead screw 20 be turned by means of a dual speed electric motor M for positioning the back gauge in dependence upon commands from a position controller 26.

Figure 2:
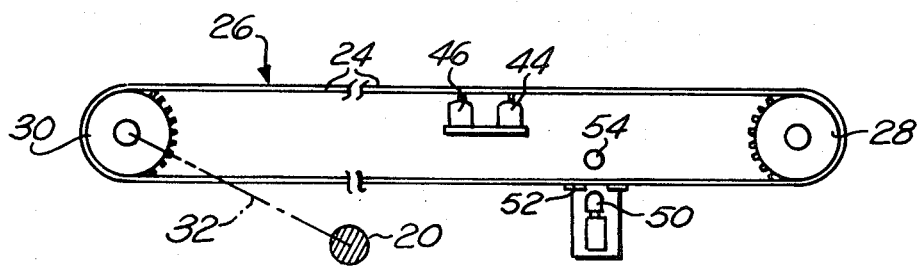
FIG. 2 is a front elevational view showing a magnetic tape having marks magnetically recorded thereon together with magnetic sensors for controlling the position of a back gauge relative to a cutting tool.
Figure 3:
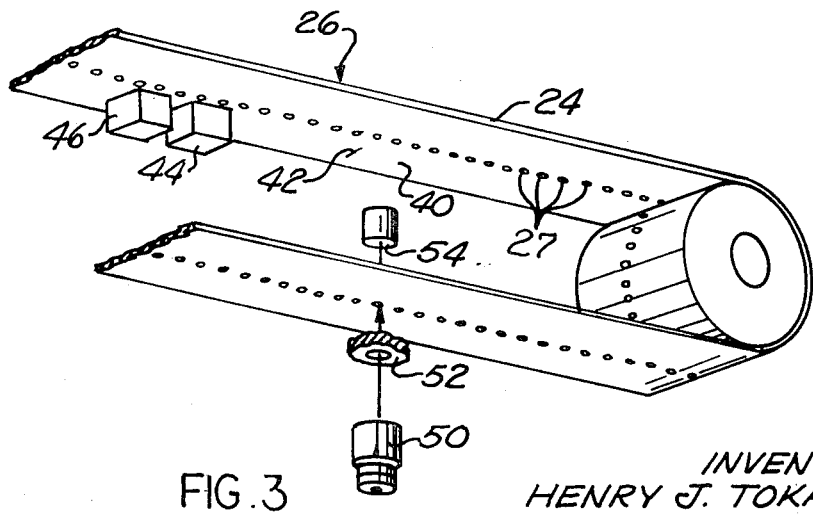
FIG. 3 is an enlarged perspective view of a portion of the magnetic tape and the sensors shown in FIG. 2.

The position controller 26, as shown in FIGS. 2 and 3, includes a record member 24 taking the form of a magnetic tape formed into a continuous belt divided longitudinally throughout its length by a plurality of evenly spaced sprocket holes 27. The record member 24 is reeved over sprocket wheels 28 and 30 so that the sprocket holes 27 mesh with teeth provided on the two sprocket wheels. Sprocket wheel 30 is driven by lead screw 20, as through a coupling chain 32, so that record member 24 is driven at a speed dependent on that of the back gauge 18. Whereas record member 24 is illustrated as being driven at a speed having a 1:1 ratio with back gauge 18, it is contemplated that speed reduction means may be provided so that the speed relationship, while proportional, need not be at a 1:1 ratio.

In accordance with a programmed cutting operation, marks are magnetically recorded on record member 24. For example, marks 40 and 42 are recorded and spaced apart in aligned fashion in a single track so as to be sequentially sensed first by a deceleration sensor head 44 and then by a stop sensor head 46 which are spaced apart in aligned relationship to sense the marks in a particular track. Sensing head 44 is designated the deceleration sensing head since upon sensing a mark it provides a low speed control signal which through suitable circuitry, to be described hereinafter with reference to FIG. 4, serves to control motor M to decelerate from a high speed to a low speed. The tape then moves at a slow speed for a distance dependent on the spacing between heads 44 and 46, and then the mark is sensed by head 46 which provides a stop signal. This signal, as will be described in greater detail hereinafter, causes the motor to be decelerated from the low speed condition to a stopped condition, at which time a cutting operation is performed.

Whenever a mark, such as mark 42, is sensed by a deceleration head 44 it is desired that the control record, and, hence, the back gauge, be controlled to move at a low speed for a distance at least slightly greater than the distance between deceleration head 44 and the stop head 46. This is necessary because motor M is normally operated to run at the high speed and, hence, if mark 40 is located behind mark 42 by a distance less than the distance between sensors 44 and 46 the motor, after having been stopped in response to head 46 sensing mark 42, will then be operated at a high speed until mark 40 is sensed by sensor 46. Because of the inertia effects of stopping back gauge 18 at the high speed it is desirable that mark 40 be sensed by stop sensor head 46 while traveling at the low speed. For this reason means are provided to insure that record member 24, and hence back gauge 18, travel a distance slightly greater than the distance between sensor heads 44 and 46 for each mark sensed by deceleration sensor head 44. This may be accomplished in various fashions. For example, since sprocket holes 27 are uniformly spaced the number of sprocket holes passing a particular point may be related to the distance between sensor heads 44 and 46. The sprocket holes may be counted, for example, with the use of a conventional lamp-photo sensor arrangement, such as lamp 50, positioned to transmit a beam of light through an apertured mask 52 so as to pass through each sprocket hole 27 and be received by a photosensor 54. The photosensor may be any conventional photosensor, such as a phototransistor or photodiode, which serves to provide an output signal pulse for each sprocket hole which passes through the lamp-photo sensor arrangement. The output signal pulses from photosensor 54, as will be explained in greater detail hereinafter, are applied to a counter which together with accompanying circuitry serves to insure that control record member 24 and, hence, back gauge 18 move at the low speed for a predetermined distance equal to a distance slightly greater than the spacing between sensor heads 44 and 46 each time a magnetic mark is sensed by deceleration sensor head 44.

Figure 4:
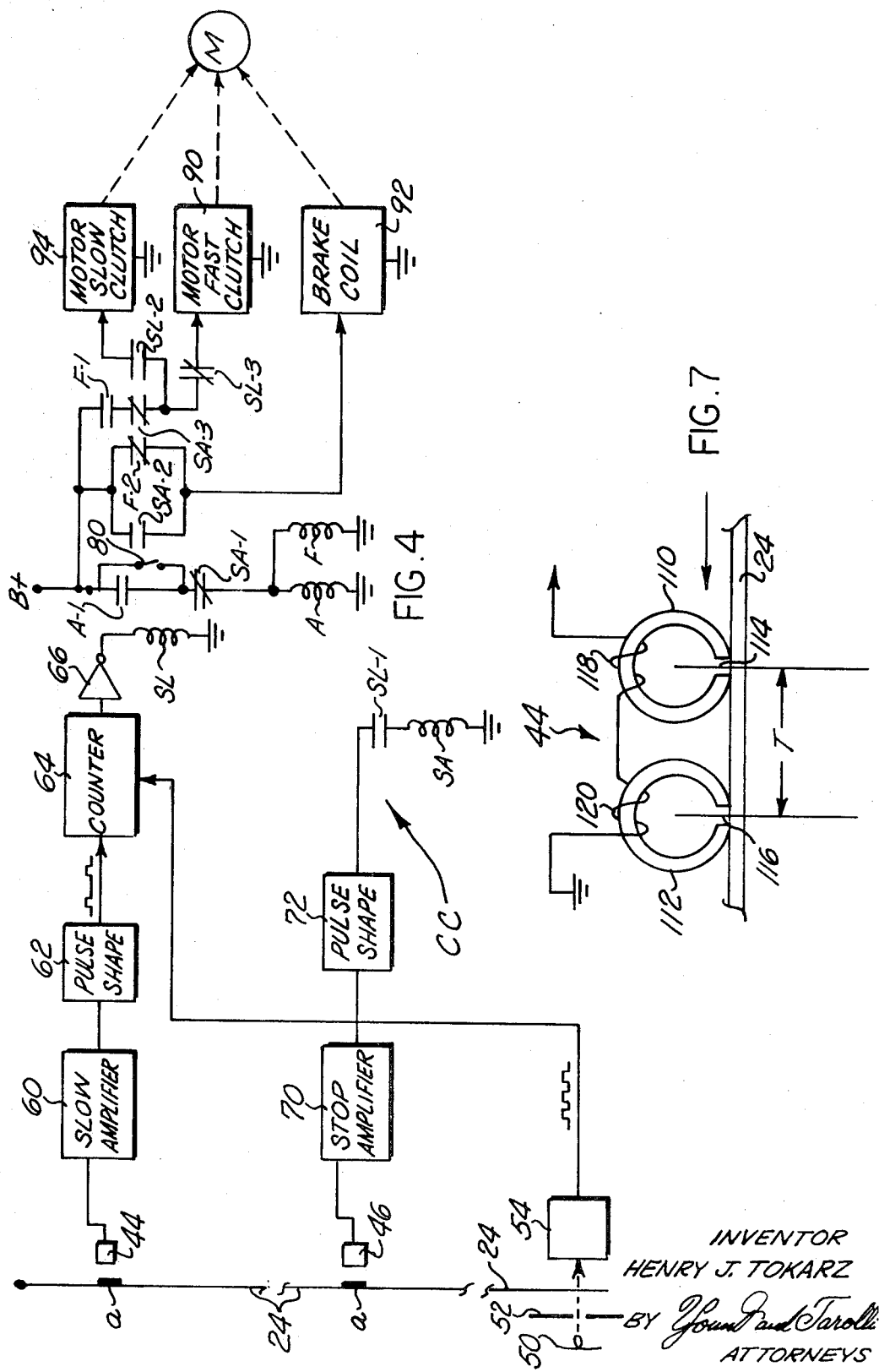
FIG. 4 is a combined schematic-block diagram illustration of a control circuit employing the present invention.

The deceleration sensor head 44, stop sensor head 46 and the photosensor 54 provide output signals which are processed by the control circuit CC, shown in FIG. 4, for purposes of controlling motor M in accordance with the program of magnetic marks recorded on record member 24. Thus, each time deceleration sensor 44 senses a magnetic mark, such as mark a, on record member 24 a pulse is generated and applied to a conventional operational amplifier 60 whose output signal pulse is, in turn, shaped to a suitable form by means of a conventional pulse shaping circuit 62. For each magnetic mark sensed by sensor head 44 pulse shaping circuit 62 applies a pulse to the reset input of a pulse counter circuit 64. Pulse counter circuit 64 may take various forms but preferably serves to provide an output signal only after a predetermined number of pulses from photosensor 54 have been counted subsequent to the receipt, at its reset input, of a pulse from pulse shaping circuit 62. For example, it may be assumed that five pulses from photosensor 54 are indicative that a mark has traveled from deceleration head 44 for a distance just exceeding that to stop sensor head 46. Once this distance has been traversed then it is permissible for the motor M to operate at the high speed. Consequently, counter 64 is preset to provide a ground or binary "0" output signal upon receipt of a pulse from pulse shaping circuit 62 indicative that a mark has been sensed by deceleration sensor head 44. Thereafter, the counter must count five pulses from photosensor 54, without being reset, and will then provide a positive, or binary "1," signal on its output circuit. After a mark, such as mark a, has been sensed by deceleration sensor head 44 and before five pulses have been counted from photosensor 54, the output circuit of counter 64 applies a ground, or binary "0," signal to a conventional inverter amplifier 66 so that its output circuit, in turn, carries a binary "1" signal. The binary "1" output signal from amplifier 66 serves to energize a motor slow control relay coil SL which, as will be described in greater detail below, serves to command the motor to decelerate from its normal high speed to its low speed and also to permit a subsequent stop signal provided by sensor head 46 to cause further deceleration of the motor to a stopped condition.

Each time the stop sensor head 46 senses a mark, such as mark a, a pulse is generated and applied to a conventional operational amplifier 70 whose output signal pulse is, in turn, shaped to a suitable form by means of a conventional pulse shaper circuit 72. The signal pulse provided by pulse shaper circuit 72 is used to energize a motor stop control relay coil SA for purposes of controlling motor M to decelerate to a stopped condition. However, relay coil SA can only be energized when normally open relay contacts SL-1 are closed, as upon energization of relay coil SL.

Upon a momentary closure of a start switch 80 a circuit is completed between a B+ voltage supply source and ground through normally closed stop relay contacts SA-1 and both a forward control relay coil F and a parallelly connected holding relay coil A. Both of these relay coils become energized and coil A serves to close associated normally open relay contacts A-1 connected in shunt with switch 80 to provide a holding circuit. This maintains coils A and F energized once switch 80 is opened. These two coils, of course, will become deenergized once relay contacts SA-1 open.

When relay coil F is energized its normally open contacts F-1 are closed so that a path is completed through contacts F-1, normally closed relay contacts SA-3 and SL-3 to maintain a motor fast clutch coil 90 energized. So long as the fast clutch coil 90 is energized the motor M, in a conventional fashion, will serve to drive lead screw 20 and, hence, back gauge 18 at the high speed. In addition, when forward relay coil F is energized its normally closed contacts F-2 are open so as to deenergize brake coil 92.

Once deceleration sensor head 44 has sensed a mark, such as mark a, counter 64 will be reset so that slow relay coil SL is energized. Consequently, its normally closed relay contacts SL-3 will open to deenergize motor fast clutch coil 90. The slow relay coil's normally open contacts SL-2 will become closed to complete a path from the B+ voltage supply source through relay contacts F-1 and SA-3 to energize a motor slow clutch coil 94, which serves to decelerate motor M from its high speed to the low speed. In addition, normally open contacts SL-1 become closed to permit energization of the stop relay coil SA until counter 64 counts out.

In the example given above, relay coil SL is energized so long as counter 64 has not counted out. Thus, each time sensor head 44 provides an output pulse, counter 64 is reset and commences to count five pulses from photosensor 54 during which period relay coil SL is energized. It is during this period that relay coil SA may be energized in response to sensor head 46 sensing a magnetic mark on record member 24. When stop relay coil SA is energized its normally open contacts SA-2 close to energize brake coil 92 and thereby decelerate motor M from the low speed to its stopped condition. In addition, when relay coil SA is energized its normally closed contacts SA-3 are open to prevent motor slow clutch coil 94 as well as motor fast clutch coil 90 from being energized. Also, relay contacts SA-1 open to deenergize both the forward relay coil F as well as the holding circuit relay coil A. It is during the stopped condition of motor M that the cutting operation may be performed.

It is contemplated that when the cutting operation is completed suitable means will momentarily close switch 80 so that brake coil 92 will be deenergized to permit continued operation of motor M. If counter 64 has not completed its counting function then, upon closure of switch 80, motor M will be operated to drive back gauge 18 at its slow speed since the slow relay coil SL will be energized. Once counter 64 has counted out, the slow relay coil SL will be deenergized. This will cause clutch coil 94 to be deenergized and clutch coil 90 to be energized so that the motor will drive back gauge 18 at the fast speed. If for some reason, as through a circuit malfunction, a mark is now "missed" by sensor head 44 and is subsequently sensed by sensor head 46 the stop relay coil SA will not become energized, as the slow relay contacts SL-1 are open. The circuitry, therefore, will cause energization of brake coil 92 only on the concurrent occurrence of a stop signal and a manifestation or indication, as by closure of contacts SL-1, that the back gauge is traveling at the slow speed.

Figure 5:
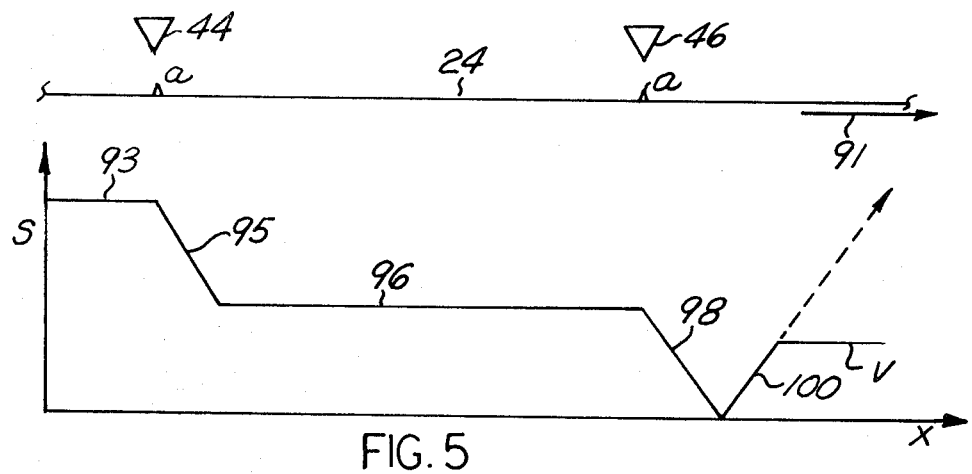
FIG. 5 is a graphical representation of the back gauge speed profile as the back gauge is decelerated to a low speed and then stopped.

In the operation described thus far, a mark, such as mark a, is sensed first by the deceleration head 44 and at a latter point in time by a stop sensor head 46. The speed profile of record member 24 and, hence, of back gauge 18 may be represented by the wafe form in FIG. 5 as a function of speed S and distance X. As record member 24 is traveling in the direction, as indicated by arrow 91, the back gauge is traveling at its high velocity, on the order of six inches per second, for a distance as indicated by the flat plateau 93 of the wave form. Once mark a has been sensed by deceleration head 44, the motor is operated to decelerate the back gauge, as indicated by wave form portion 95, to its low speed, as indicated by wave form portion 96. The low speed, for example, may be on the order of 0.5 inches per second. Thereafter mark a is sensed by stop sensor 46 which causes the motor to decelerate, as indicated by wave portion 98, to a stopped condition. The cutting operation is then performed. Thereafter, the back gauge 18 is accelerated, as indicated by wave form portion 100, to either its low speed or its high speed level depending upon whether counter 64 has completed its counting function.

The discussion given above has been with respect to the speed profile obtained upon sequentially sensing mark a by sensor heads 44 and 46. Consider now the speed profile obtained once mark a has been sensed by stop sensor head 46 so that the record member 24 decelerates to a stopped condition. Also, assume that sensor head 44 is a single gap magnetic sensor which serves to sense a mark, such as mark *a*, only when the mark is directly beneath the head of the sensor. If a second mark, such as mark *b*, see FIG. 6, trails mark *a* by a distance exactly equal to the distance between the focusing points of sensor heads 44 and 46, then as mark *a* is sensed by stop sensor head 46 mark *b* is sensed by deceleration sensor head 44. Because mark *a* was sensed by sensor head 46 the back gauge is decelerated to a stopped condition, and since mark *b* was sensed by deceleration head 44 a reset pulse is applied to counter 64 preventing the motor from driving the back gauge at the high speed for a predetermined count. However, it is possible that a mark *c* trailing just behind mark *b* will not be properly sensed by the deceleration sensor head 44. That is, deceleration sensor head 44 requires relative movement between the magnetic marks on the record member 24 and the sensor head. When the record member is decelerated below a predetermined velocity V, the relative movement will not be sufficient for deceleration head sensor 44 to provide an effective output signal pulse. Stated otherwise, any output signal pulse obtained from sensor 44 when the velocity is less than velocity V will not be of sufficient magnitude to be effectively detected and amplified by an associated amplifier, such as amplifier 60 in FIG. 4. With reference to the speed profile wave form of FIG. 6, it will be noted that marks located between marks *b* and *c* will be sensed by deceleration head 44 although marks trailing mark *c* for a dead zone distance Z to a mark *d* will not be detected, as they will be moving at a velocity less than that of velocity V when passing immediately beneath deceleration sensor head 44. Hence, mark *c* and trailing marks for distance Z to mark *d* will not provide pulses to reset counter 64. This problem exists, for example, when sheet material 12 is to be cut into ribbons, with incremental cuts being on the order of approximately 1 inch, when the sensor heads 44 and 46 are positioned apart by a distance slightly less than 1 inch.

Figure 8:
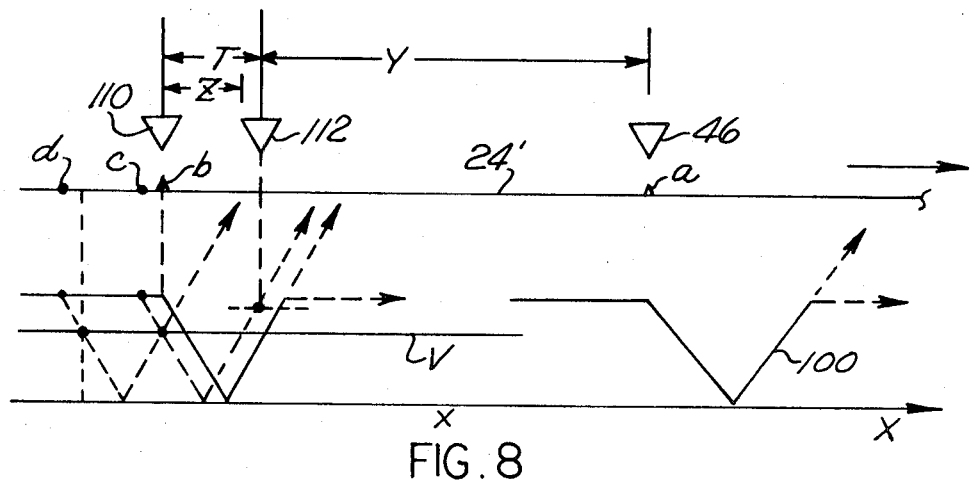

In accordance with the present invention, the deceleration sensor head 44 is constructed as a dual gap sensor head, as shown in FIG. 7. Thus, the sensor head includes a pair of cores 110, 112 having their sensing gaps 114 and 116 spaced apart along the length of record member 24 by a distance T which is slightly greater than dead zone distance Z. Cores 110 and 112 are respectively provided with sense windings 118 and 120 which are connected together in series aiding fashion between a reference source, such as ground, and the input to amplifier 60. Although two cores 110 and 112 are illustrated herein the same effect may be obtained by using a FIG. 8 core structure so as to effectively provide two cores attached to each other with a common center leg. In any event, whether two physically separated cores or two joined cores having a FIG. 8 construction are employed, the sensing gaps 114 and 116 are spaced a distance T.

Figure 6:
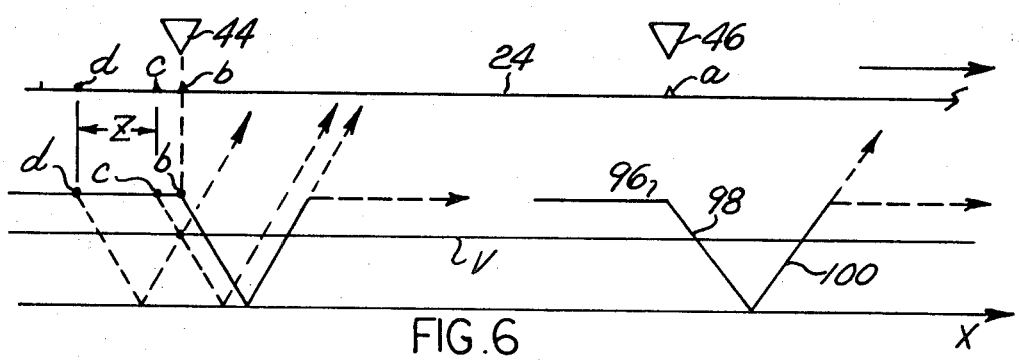
FIG. 6 is a graphical illustration of the profile of the back gauge when it is decelerated from its low speed to a stopped condition if a single gap deceleration sensor head is employed.

By utilizing the dual gap magnetic sensor, marks located in dead zone Z, in the example given with reference to FIG. 6, will be sensed by one or the other of the two cores so that a low speed signal pulse is provided. This is shown schematically with the speed profile graphical illustration of FIG. 8. Cores 110 and 112 are spaced apart so that their sensing gaps are spaced by a distance T, which is slightly greater than the dead zone distance Z. The stop head sensor 46 serves to sense a mark by a distance Y after the same mark is sensed by core 112. Core 110 serves to sense mark *b* and any marks located between marks *b* and *c*. Mark *c*, as well as any marks located between mark *c* and *d*, will be sensed by core 112 during the slow down, start up operation. Marks trailing mark *d* will, of course, be sensed by core 110 in advance of that by core 112. With this construction, marks located in the dead zone Z of FIG. 6 will be sensed either by core 110 or core 112 so that a low speed signal pulse is obtained to reset counter 64.

Although the invention has been described with reference to a preferred embodiment, it is to be appreciated that the invention is not limited thereto as other modifications and arrangements of parts may be made within the spirit of the invention as defined by the appended claims.

What is claimed is:

1. In a material cutting machine control for controlling the positioning of a movable back gauge driven by motor means at a normal high speed and controllable to a low speed or stopped condition and comprising:

a record member having back gauge position defining control marks recorded thereon;

plural sensor means;

means for imparting relative motion between said record member and said sensor means proportional to the velocity of said back gauge;

speed control means for selectively controlling said motor means to drive said back gauge at said low speed in response to a low speed control signal and to said stopped condition in response to a stop control signal; and said plural sensor means including first sensor means positioned for sequentially sensing said control marks during said relative motion and providing a said low speed control signal for each sensed mark, second sensor means positioned for sequentially sensing said control marks during said relative motion and subsequent to that by said first sensor means and providing a said stop control signal for each sensed mark, and third sensor means positioned intermediate said first and second sensor means for sequentially sensing said control marks during said relative motion and subsequent to that by said first sensor means and prior to that by said second sensor means and providing a said low speed control signal for each sensed mark, said first and third sensor means being constructed to provide a said low speed signal only when said relative motion exceeds a predetermined velocity, said first and third sensor means being spaced from each other by a distance sufficient that when said relative motion is changed from zero to at least said predetermined velocity then a low speed signal will be provided by either said first or said third sensor means whereby said speed control means will control said motor means to drive said back gauge at said low speed.

2. In a material cutting machine control as set forth in claim 1, wherein the said distance between said first and third sensor means is greater than the relative displacement distance required for said relative motion to be decreased from said predetermined velocity to zero and then increased to said predetermined velocity.

3. In a material cutting machine control as set forth in claim 1, wherein the said distance between said first and third sensor means is greater than twice the relative displacement distance required for said relative motion to be decreased from said predetermined velocity to zero.

4. In a material cutting machine control as set forth in claim 1, wherein said record member is a magnetic control record having said marks magnetically recorded thereon, said first and third sensor means being magnetic mark sensing means positioned in close proximity to said control record for developing at least one said low speed control signal when said relative motion exceeds said predetermined velocity.

5. In a material cutting machine control as set forth in claim 4, wherein said first and third magnetic mark sensing means includes dual gap magnetic core means having two magnetic mark sensing gaps positioned in close proximity to said record member and spaced apart by said predetermined distance and a pair of coils mounted on said core means each respectively associated with one of said gaps.

6. In a material cutting machine control as set forth in claim 5, wherein said magnetic core means includes first and second cores each having one of said sensing gaps and one of said coils mounted thereon, said pair of coils being connected together in series-aiding fashion to a common signal amplifying means.

7. In a material cutting machine control as set forth in claim 4, wherein said means for imparting relative motion includes means for moving said record member at a speed proportional to that of said back gauge while said sensor means are stationary.

8. In a material cutting machine control as set forth in claim 4, including switching means having a normal first condition for controlling said motor means to drive said back gauge at said normal high speed and actuatable to a second condition for use in preventing said back gauge from being driven at said high speed; and, switch control means for, in response, to each said low speed signal, actuating said switching means to said second condition for a period dependent upon a predetermined travel distance of said back gauge so that during said predetermined travel distance said back gauge is prevented from moving at said high speed.

* * * * *